(No Model.)  J. OLSON.  2 Sheets—Sheet 1.
PLANING MACHINE.
No. 539,998.  Patented May 28, 1895.
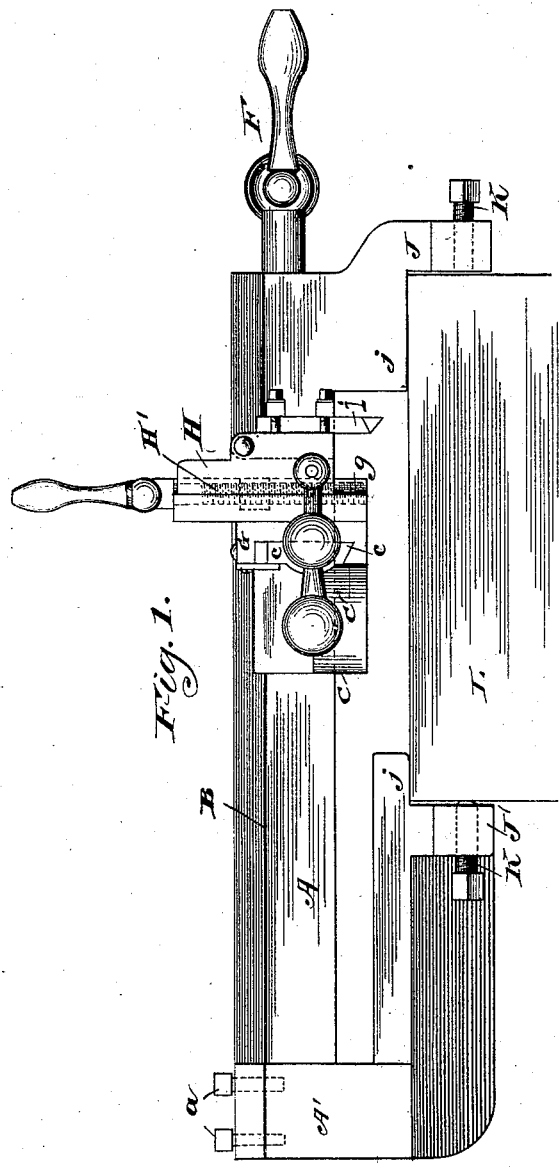
Witnesses,  Inventor, (No Model.) 2 Sheets—Sheet 2.
J. OLSON.
PLANING MACHINE.
No. 539,998. Patented May 28, 1895.
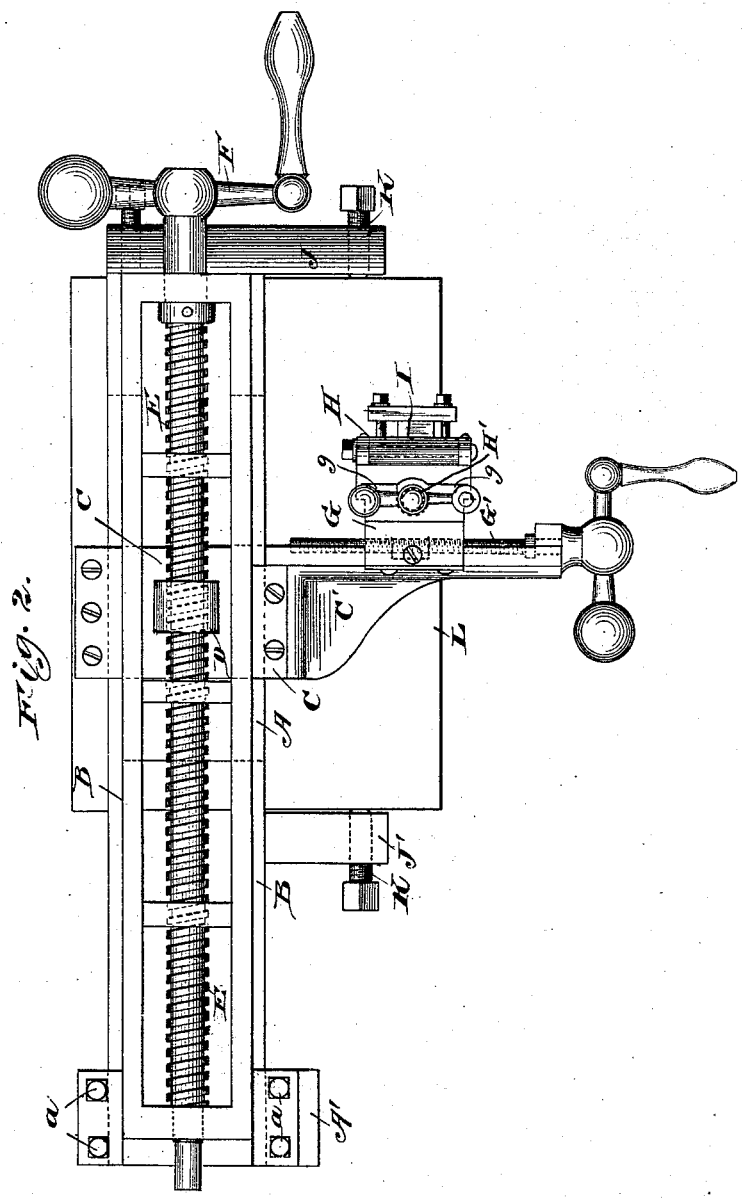
Witnesses,
Inventor,
John Olson
By Offield Towle Linthicum
Attys.

UNITED STATES PATENT OFFICE.

JOHN OLSON, OF CHICAGO, ILLINOIS.

PLANING-MACHINE.

SPECIFICATION forming part of Letters Patent No. 539,998, dated May 28, 1895.

Application filed February 10, 1894. Serial No. 499,771. (No model.)

*To all whom it may concern:*

Be it known that I, JOHN OLSON, of Chicago, Illinois, have invented certain new and useful Improvements in Planing-Machines, of which the following is a specification.

This invention relates to a machine which is particularly adapted for use in surfacing stone but which may be applied to planing other surfaces of other materials.

The chief object of the invention is to construct a machine which is easily portable and which can be applied to the work in contra-distinction to previous constructions of planers which are intended to be stationary and to which the work must be brought and adjusted. For example, the machine of this invention is capable of being carried about a stone yard and applied to the blocks of stone in any position in which they may be found lying, and without moving the stone to the machine. It may be made of such size that one or two men may lift it about from place to place; and it is adapted to be clamped directly to the stone, while the cutting tool is mounted so as to be capable of lateral movement to bring a fresh surface under the action of the cutter. The cutting tool has, in the preferred arrangement, three movements: first, a travel lengthwise of the surface upon which it operates; second, a vertical adjustment up and down to regulate the depth of cut, and, third, a lateral movement so as to adapt it to traverse a surface parallel to that previously traced.

Some of the features of the invention are also shown in a companion application, Serial No. 499,772, and it is not my purpose to cover anything in the present application shown in said companion application, except as hereinafter pointed out in the claim.

In the preferred construction of my machine, there is employed a frame having a slide or guide way thereon, a traveling carriage adapted to move longitudinally upon said frame, a tool holder having a lateral movement on an extension of said carriage and a tool chuck or clamp having a vertical movement on said holder, together with proper screw shafts for imparting the necessary movements to said parts and suitable clamps for securing the planer to the work.

In the accompanying drawings, Figure 1 is a side elevation showing the machine clamped to a block in position for use, and Fig. 2 is a plan view of the same.

In the drawings, A represents the frame of the planer provided with the longitudinal parallel guides B, B, to which are fitted, so as to slide thereon, the carriage C. Said carriage has a nut D through which is threaded the screw shaft E, the latter having its bearing in the cross piece of the frame and having an operating crank F. The turning of this crank effects the longitudinal travel of the carriage. Said carriage is provided with a laterally extending bracket C′, having the slides or guides c at right angles to the longitudinal travel of the carriage. Upon these lateral guides is mounted the tool carriage G, which is fitted with vertical guides g and upon these guides slide the block H, carrying the tool holder I, with its tool i, which will be adapted for the special work in hand. The tool holder is preferably hinged at its top to the block H so that the tool will cut when the carriage G is moved in one direction and slide over the work on the return movement.

G′ represents the shaft for moving the tool carriage G, and H′ represents the shaft for adjusting the chuck vertically.

A′ represents a sliding frame which slides on the same guides as the carriage.

J represents a head piece formed integrally with the frame A, and J′ represents the tail piece which may be formed integrally with the sliding frame member A′, the latter being adapted to slide upon the guides or slides B, and frame A′ can be fixed in any desired position by the set bolts a.

The manner of use will now be understood. The planer is affixed to the work, as shown in Fig. 1, by clamping it thereto, the head piece J and the tail piece J′ preferably having the offsets or shoulders j resting on the top of the work, while the clamp screws K are turned up to engage the sides of the block. The carriage is then run back and the tool lowered into cutting position, whereupon the operator turns the crank F, thus causing the carriage to move forward and the tool is carried over the work from end to end. The carriage is moved back by reversing its operating screw and thereupon the tool holder is moved laterally a distance equal to the width of cut of the tool and the operation is repeated.

It will be observed that in this construction there is no bed employed, and the carriage and tool are reciprocated instead of moving the work, less power being required to carry the tool than to carry the work, but this feature is broadly claimed in my said companion application. It will also be observed that the planer herein shown is adapted to be readily moved from place to place and to be clamped to the work whenever the latter is found.

The block of material shown may represent a stone or any other material which it is desired to surface.

Without limiting myself to precise details of construction, I claim—

A portable planer, comprising, in combination, a main frame having guides thereon, a supplemental frame sliding on said guides and carrying a tail-piece for clamping the work, a carriage also slidably mounted upon the main frame and an operating screw engaged with said carriage and whereby the latter is reciprocated, a bracket, $C'$, extending laterally from said carriage and having guides, $c$, a tool-holder mounted on the bracket and adapted to slide on said guides, whereby it is rendered laterally adjustable with relation to the carriage, and a head-piece carried by the frame and provided with clamping means, substantially as described.

JOHN OLSON.

Witnesses:
N. M. BOND,
FREDERICK C. GOODWIN.